(12) United States Patent
Idan et al.

(10) Patent No.: US 7,197,651 B2
(45) Date of Patent: Mar. 27, 2007

(54) POWER MODE CALIBRATION FOR ADD-ON CARDS ON MOBILE PLATFORMS

(75) Inventors: Nevo Idan, Ya'akov (IL); Igor Markov, Haifa (IL); Alon Naveh, Ramat Hasharon (IL)

(73) Assignee: Intel Corporation, Santa Clara, CA (US)

( * ) Notice: Subject to any disclaimer, the term of this patent is extended or adjusted under 35 U.S.C. 154(b) by 528 days.

(21) Appl. No.: 10/698,175

(22) Filed: Oct. 30, 2003

(65) Prior Publication Data

US 2005/0097370 A1    May 5, 2005

(51) Int. Cl.
*G06F 1/26* (2006.01)

(52) U.S. Cl. ...................................................... 713/300
(58) Field of Classification Search ................ 713/300
See application file for complete search history.

(56) References Cited

U.S. PATENT DOCUMENTS

| | | | |
|---|---|---|---|
| 5,532,945 A | * | 7/1996 | Robinson ................... 713/321 |
| 6,483,622 B1 | * | 11/2002 | Motohashi .................. 398/128 |
| 6,539,476 B1 | * | 3/2003 | Marianetti et al. .......... 713/100 |
| 6,691,236 B1 | * | 2/2004 | Atkinson .................... 713/320 |
| 6,697,953 B1 | * | 2/2004 | Collins ....................... 713/320 |
| 6,738,834 B1 | * | 5/2004 | Williams et al. ............... 710/8 |
| 6,804,541 B1 | * | 10/2004 | Muramatsu et al. ........ 455/573 |
| 6,976,179 B1 | * | 12/2005 | Gosselin et al. ............ 713/300 |
| 2004/0088590 A1 | * | 5/2004 | Lee et al. ................... 713/300 |
| 2004/0215982 A1 | * | 10/2004 | Subramanian et al. ...... 713/300 |
| 2005/0024651 A1 | * | 2/2005 | Yu et al. ...................... 358/1.9 |

* cited by examiner

Primary Examiner—Thomas Lee
Assistant Examiner—Vincent Tran
(74) Attorney, Agent, or Firm—Blakely, Sokoloff, Taylor & Zafman LLP

(57) ABSTRACT

In one embodiment, the present invention provides a method for dynamically determining a power mode with which to operate an add-on component within a host processing system; and operating the add-on component in the power mode.

24 Claims, 4 Drawing Sheets

POWER MODE CALIBRATION FOR ADD-ON CARDS ON MOBILE PLATFORMS

FIELD OF THE INVENTION

This invention relates to host processing systems and to add-on cards thereon. In particular, the invention relates to configuring the power mode of an add-on card on a host processing system.

BACKGROUND

Host processing systems such as mobile computing systems, may be configured through the addition of various add-on cards or components. For example, a mobile computing system may be configured through the addition of a Network Interface Card (NIC), a Global Positioning Satellite (GPS) card, a blue-tooth card, etc.

Sometimes, the add-on cards may perform complex data processing and may require significant amounts of power. It will be appreciated that when the host processing system is running on battery power, the amount of power consumed by the add-on card has to be controlled so as to avoid the battery discharging to a dangerously low level.

Existing power management solutions pre-configure the add-on cards to operate within certain operating parameters, independently of the needs of a user. Thus, for example, if a user is currently running an application that requires high performance, a power management solution of the prior art would continue to operate with the pre-configured operating parameters even if the battery level is currently high enough to support the required high performance.

DETAILED DESCRIPTION

In one embodiment, the invention provides a method comprising dynamically determining a power mode with which to operate an add-on component within a host processing system; and operating the add-on component in the power mode.

An example of an add-on card that may be operated in accordance with the techniques described herein include a Network Interface Card (NIC), a Global Positioning Satellite (GPS) card, a blue-tooth card, etc.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
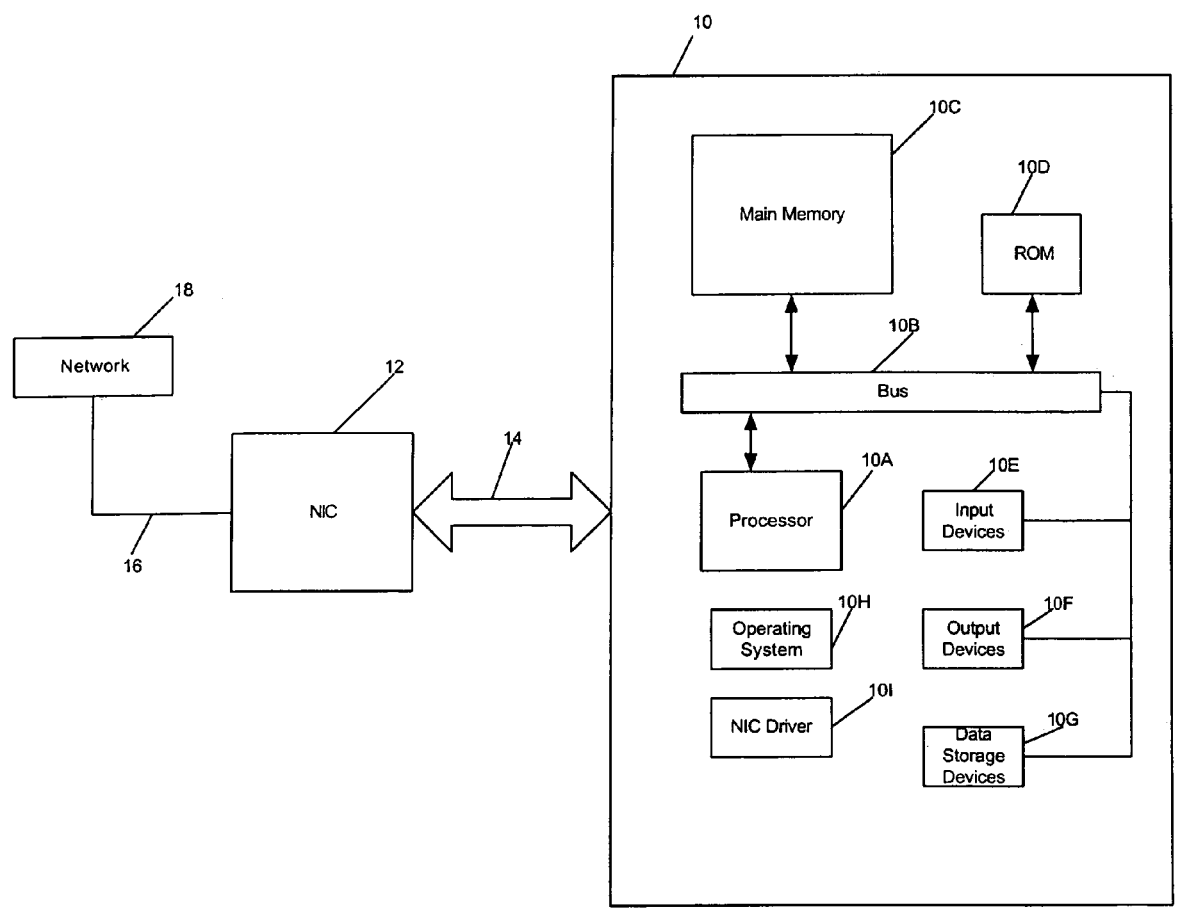
FIG. 1 shows a high-level block diagram of a host processing system, in accordance with one embodiment of the invention.

FIG. 1 of the drawings shows a high-level block diagram of a host processing system 10 which includes an add-on component in the form of a NIC 12. The host processing system 10 includes a processor 10A which is coupled to a bus 10B. The bus 10B may be a Peripheral Component Interconnect (PCI) bus, an Industry Standard Architecture (ISA) bus, a Small Computer System Interface (SCSI) bus, a Universal Serial Bus (USB), or a bus conforming with any other known bus architecture or specification. Further, the host processing system 10 may include two or more busses (e.g., a PCI bus, a USB). The processing system 10 also includes a main memory 10C, which may comprise one or more random access memory (RAM) devices. The main memory 10C is also coupled to the bus 10B. The main memory 10C stores information and instructions to be executed by the processor 10A and may also store temporary variables or other intermediate information during execution of instructions by the processor 10A. The processing system 10 also includes read-only memory (ROM) 10D which is coupled via the bus 10B to the processor 10A. The ROM 40 is for storing static information and instructions for the processor 10A.

The host processing system 10 also includes one or more input devices 10E, such as a keyboard or mouse, coupled to the processor 10A through the bus 10B. Also coupled to the processor 10A via the bus 10B are one or more output devices 10F. Typical output devices 10F include printers and display monitors. The host processing system 10 further includes one or more data storage devices 10G coupled to the processor 10A via the bus 10B. Common data storage devices include hard disk drives, floppy disk drives, and CD (Compact Disk) ROM drives. It will be understood by those of ordinary skill in the art that the host processing system 10 may include other components and sub-systems in addition to those shown and described with respect to FIG. 1. By way of example, the host processing system 10 may include video memory, cache memory, as well as other dedicated memory, and additional signal lines and busses.

Resident on the host processing system 10 is an operating system 10H, which may comprise any operating system known in the art. The operating system 10H handles the interface to the input devices 10E, the output devices 10F, and the data storage devices 10G. The operating system 10H also schedules tasks and presents a default interface to a user when no application program is running, in addition to performing other functions.

The host processing system 10 may also have one or more application programs resident thereon and running. The host computer system 10 further includes one or more drivers, each driver comprising a program or piece of code providing an interface between a peripheral device and the operating system 10H, and/or an application program. One such driver is a NIC driver 10I. The NIC driver 10I, in conjunction with the operating system 10H, controls the interface between the host processing system 10 and the NIC 12.

Transfer of data and instructions between the NIC 12 and the host processing system 10 occurs over a communication path 14. The communication path may comprise any suitable connector, or coupling system known in the art. By way of example, the communication path 14 may comprise a PCI compatible connector on the NIC 12. The PCI connector, in turn, mates with a corresponding PC card socket in the host processing system 10. The communication path 14 may also be established using a Personal Computer Memory Card International Association (PCMCIA) compatible connector on the NIC 12, the NIC 12 then being configured as, for example, a PC card for insertion into a 32-bit card bus slot on the host processing system 10. Further, the communication path 14 may be established via a USB compatible connector.

The NIC 14 connects the host processing system to a computer network 18, via a network connection 16. The network connection may be hard wire, such as a fiber optic cable, a coaxial cable, a twisted pair cable, or a telephone line. The network connection 16 may also be wireless. For example, the network connection 16 could be achieved via a cellular phone, a cellular compatible modem, or a personal communication services (PCS) phone and digital modem.

The network 18 may be based on any one of numerous well-known technologies. For example, the network 18 may be Ethernet (10 Mb/sec), Fast Ethernet (100 Mb/sec) or Gigabit Ethernet.

Figure 2:
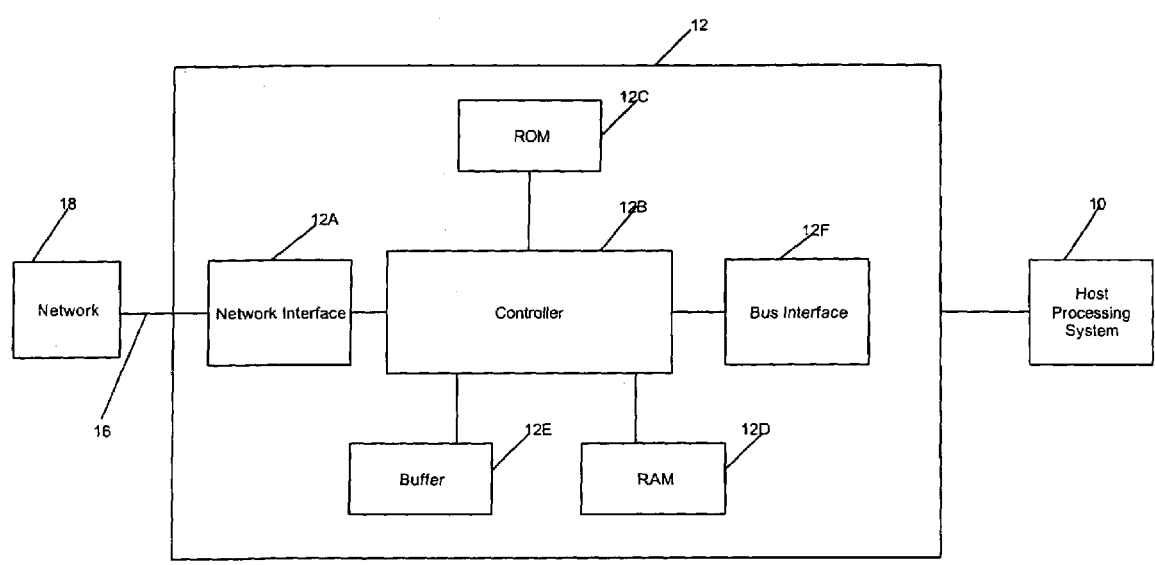
FIG. 2 shows the components of the Network Interface Card (NIC) of the system of FIG. 1, in greater detail.

An embodiment of the NIC 12 is shown in FIG. 2 of the drawings. Referring to FIG. 2, the NIC 12 includes a network interface 12A. The network interface 12A provides, for example, a wireless interface to the network connection 16. Thus, the network interface 12A includes transceiver circuitry for transmitting and receiving data over the network connection 16. In addition, the network interface may include logic and/or circuitry for establishing a wireless connection (e.g., Code Division Multiple Access (CDMA)).

Coupled to the network interface 12A is a controller 12B. The controller 12B controls the operation of the NIC 12. Exemplary functions performed by the controller 12B include data transfers, initialization, diagnostics, error detection and synchronization with network and/or host bus clocks. The controller 12B also receives commands from the NIC driver 10I resident on the host processing system 10, and generates interrupts to the host processing system 10, during, for example, data transfers. The controller 12B may comprise any processor, application-specific integrated circuit (ASIC), or other suitable integrated circuit device known in the art.

The NIC 12 may further include one or more memory devices or circuits. For example, a read-only memory (ROM) 12C may be coupled to the controller 12B. The ROM 12C stores instructions and/or data for operation of the controller 12B (or the NIC 12 generally). Further, the ROM 12C may contain a unique MAC (Media Access Control) address or link-layer address for the NIC 12. The NIC 12 may also include random access memory (RAM) 12D coupled to the controller 12B. The RAM 12D provides temporary storage of control information and network data (e.g., or frame data). In addition, a buffer 12E may be coupled to the controller 12B. The buffer 12E provides temporary storage for packet or frame data.

A bus interface 12F is disposed on the NIC 12 and is coupled to the controller 12B. The bus interface 12F establishes and maintains communications with the system bus 10B (e.g., a PCI bus or a USB) in the host processing system 10. The bus interface 12F may also provide synchronization with the host bus clock.

It should be appreciated that the NIC 12 shown in FIG. 2 is only exemplary and, further, that the NIC 12 many include may additional components, which have been omitted for clarity. By way of example, the NIC 12 may include cache, clocks, timers, counters, registers, address tables, as well as additional logic circuitry, buffers, and memory circuitry. It should be further understood that the NIC 12 may not include all of the components shown in FIG. 2. Those of ordinary skill in the art will appreciate that many components of the NIC 12 may be integrated or share common circuitry. For example, the bus interface 12F may be integrated into the controller 12B and, similarly, the network interface 12A (or specific portions thereof) may be integrated into the controller 12B.

In accordance with the techniques disclosed herein, part of the function of the NIC driver 10I is to determine, dynamically, a power mode with which to operate the NIC 12. Thereafter, the NIC driver 10I sends control signals via the communication port 14 to the NIC 12 to cause the NIC 12 to operate in the power mode.

Figure 3:
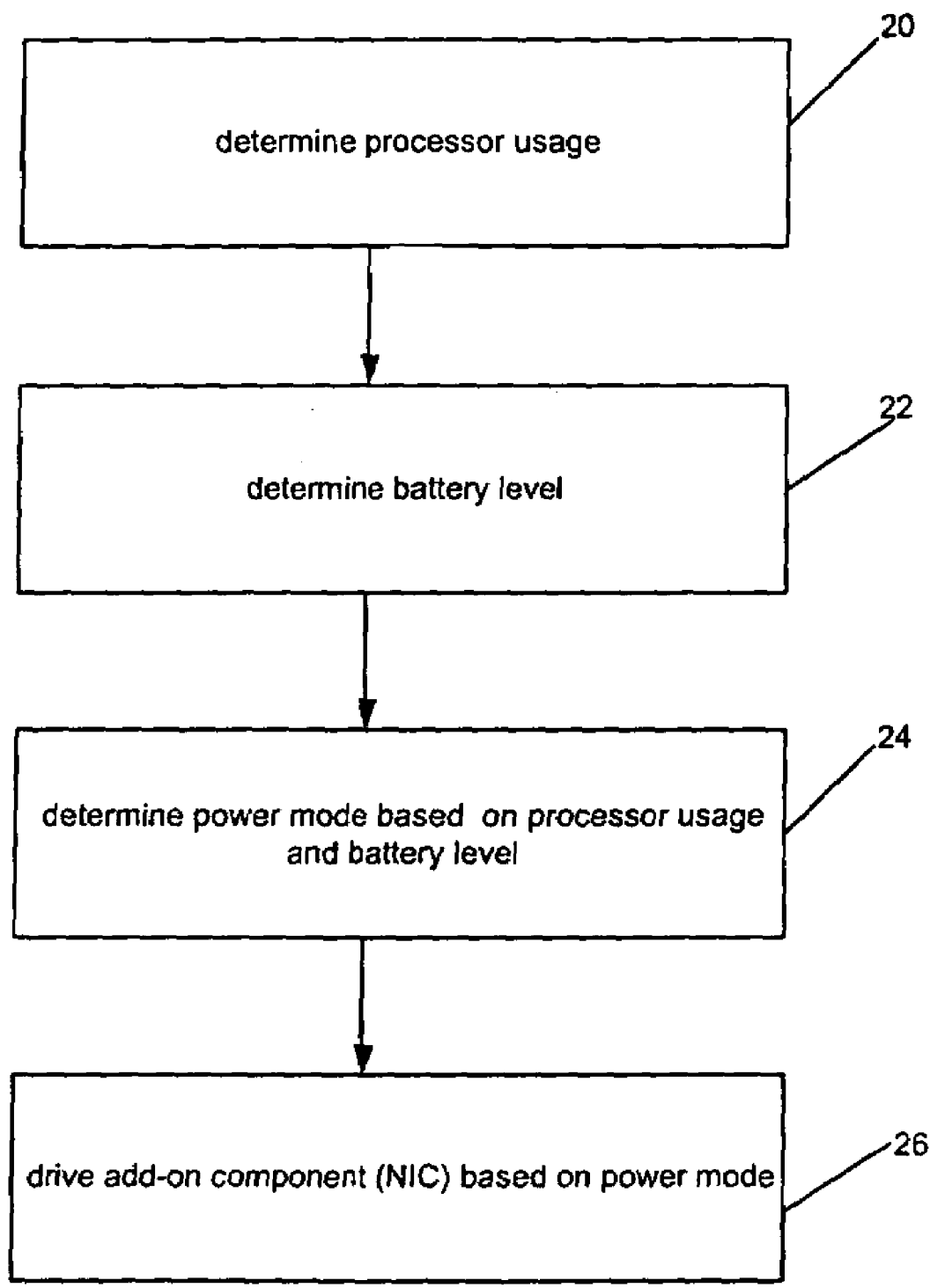
FIGS. 3 and 4 illustrate techniques to drive the NIC of FIG. 1 in accordance with one embodiment.

In order to determine the power mode, dynamically, in one embodiment, the NIC driver 10I performs the method shown in FIG. 3 of the drawings. Referring to FIG. 3 at block 20, the NIC driver 10I determines a usage for the processor 10A (hereinafter called "processor usage"). The processor usage is a measure or indication of how much work the processor 10A is performing within a time period. In one embodiment, the NIC driver 10I determines the processor usage by querying a performance monitor or register of the processor 10A. A performance monitor is a general-purpose register that may be configured to monitor certain events occurring within the processor 10A. One such event is the amount of worked being performed by the processor 10A.

At block 22, the NIC driver 10A determines a current battery level for a battery (not shown) of the host processor system 10. In one embodiment, in order to determine the current battery level, the NIC driver 10I queries the operating system 10H and obtains the current battery level from the operating system 10H.

At block 24, the NIC driver 10I determines the power mode based on the processor usage and the battery level. In order to determine the power mode at block 24, the algorithm shown in FIG. 4 of the drawings is executed, in accordance one embodiment. At block 26, the NIC driver 10I drives the NIC 12 based on the power mode. The operations performed at block 26, include sending controls signals via the communication path 14 to the NIC controller 12B to cause the NIC controller 12B to control the NIC 12 based on the power mode.

In one embodiment, each power mode is pre-configured within the NIC 12. Each power mode includes specific setting for operating parameters of the NIC 12. For example, in one embodiment, each power mode has a different setting for how frequently the NIC 12 scans for a network connection. It will be appreciated, that if the battery level on the host processing system 10 is low, then the NIC driver 10I should select a power mode for the NIC 12 which scans only infrequently, if at all, for a network connection, in order to conserve power. On the other hand, if the battery life of the battery for the host processing system 10 is high, and the user of the host processing system is running an application that requires high performance, then the NIC driver 10I should select a power mode for the NIC 12 in which the NIC 12 scans more frequently for a network connection.

Figure 4:
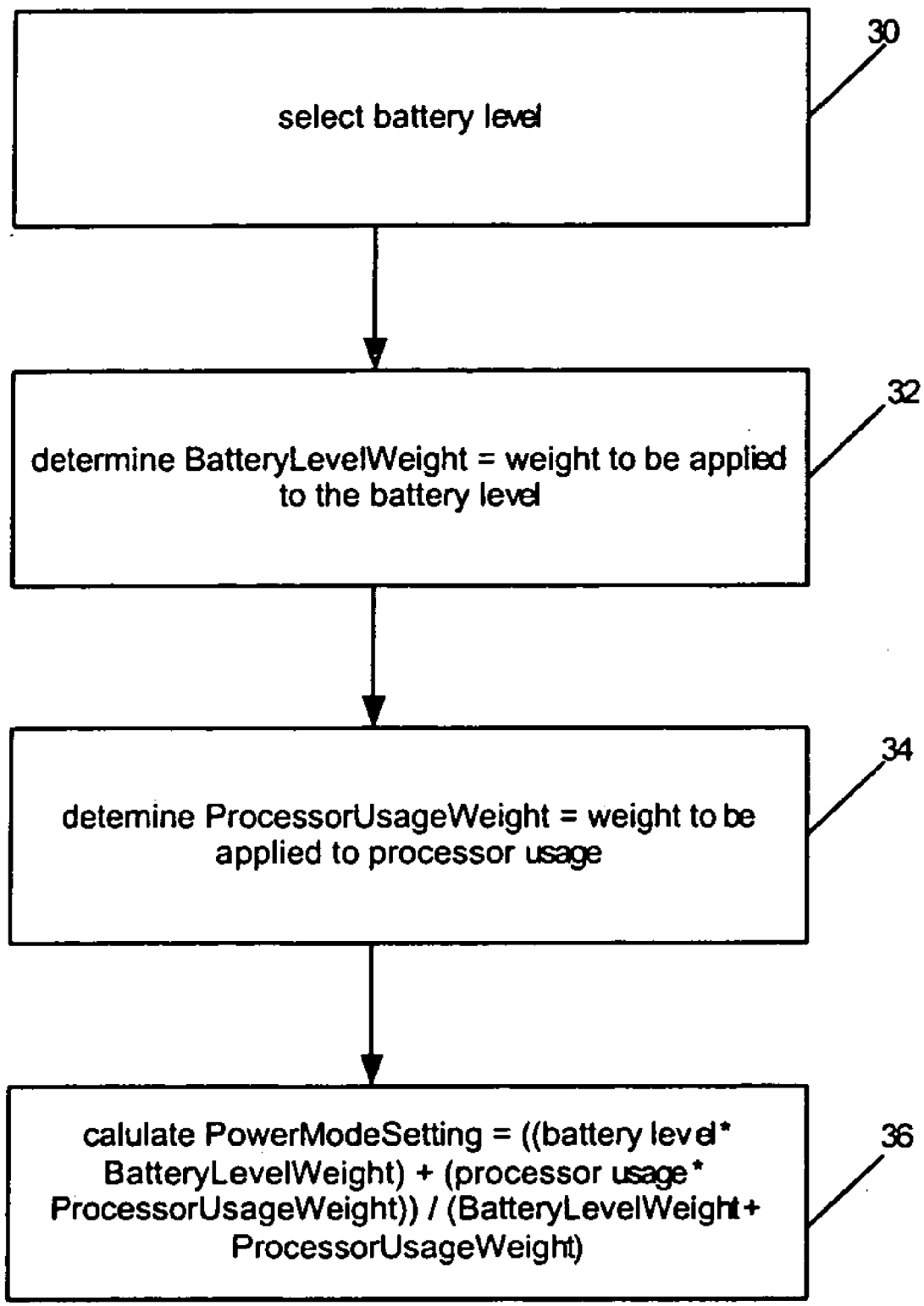

It will be appreciated that using the processor usage, and the current battery level, it is possible to have many algorithms to select an appropriate power mode. One such algorithm is illustrated in FIG. 4 of the drawings. Referring to FIG. 4 at block 30, the NIC driver 10I selects a battery level. In one embodiment, the current battery life which is expressed as a percentage, is divided into levels 1 to 5 as follows:

| | |
|---|---|
| Level 1 = | 60–100%; |
| Level 2 = | 60–50%; |
| Level 3 = | 50–40%; |
| Level 4 = | 40–30%; and |
| Level 5 = | 30–0%. |

Thus, for example, if the current battery life is say 80%, then the NIC driver 10I will select level 1, at block 30.

At block 32, the NIC driver 10I determines a value called BatteryLevelWeight, which is essentially a weight to be applied to the battery level. In one embodiment, the BatteryLevelWeight is fixed at a particular value, e.g., 3. At block 34, the NIC driver 10I determines a value called ProcessorUsageWeight, which is essentially a weight to be applied to the processor usage. In one embodiment, the ProcessorUsageWeight may be a fixed value, e.g., 1.

At block 36, the NIC driver 10I calculates a value called PowerModeSetting as follows:

$$PowerModeSetting = \frac{Battery\ Level * BatteryLevelWeight + Processor\ Usage * ProcessorUsageWeight}{BatteryLevelWeight + ProcessorUsageWeight}$$

It will be appreciated that the PowerModeSetting value is a modified average weight function which assigns a higher weight to the current battery level than to the processor usage. Thus, the algorithm is biased to save power at the expense of performance.

Based on the above described algorithm, if the processor usage is 1, and the battery level is say 80%, then the PowerModeSetting=1. In one embodiment, the operating parameters associated with the PowerModeSetting 1 would be hard coded within the NIC 12. These parameters may include parameters to keep all functional units in an active state as opposed to a sleep state and to operate the NIC 12 to provide the greatest data transfer rate.

In contrast to the above scenario, if the processor usage is say 4, indicating a high level of processor usage, and the battery life is say 30%, then the NIC driver 10I will calculate the PowerModeSetting to be 4. The operating parameters associated with the PowerModeSetting 4, may be hard coded within the NIC 12, and may, in one embodiment, cause the NIC 12 to operate in a mode that is biased to conserve power. In other words, the NIC 12 will try to do as less as possible by turning off functional units, etc.

Although the present invention has been described with reference to specific exemplary embodiments, it will be evident that the various modification and changes can be made to these embodiments without departing from the broader spirit of the invention as set forth in the claims. Accordingly, the specification and drawings are to be regarded in an illustrative sense rather than in a restrictive sense.

What is claimed is:

1. A method, comprising:
    determining a processor usage for a processor of a host processing system;
    determining a battery level for a battery of the host processing system;
    calculating a power mode value based on the processor usage, the battery level, a
    processor usage weight, and a battery level weight;
    selecting the power mode based on the power mode value; and
    operating an add-on component within the host processing system in the power mode.

2. The method of claim 1, wherein the add-on component comprises a Network Interface Card (NIC).

3. The method of claim 1, wherein the processing system comprises a mobile processing system.

4. The method of claim 1, wherein determining the processor usage comprises reading a value corresponding to the processor usage from a register of the processor.

5. The method of claim 1, wherein determining the battery level comprises querying an operating system for the processing system to obtain the battery level.

6. The method of claim 1, which is performed by a driver for the add-on component.

7. The method of claim 1, wherein calculating the power mode value is in accordance with the formula:

$$PowerModeSetting = \frac{Battery\ Level * BatteryLevelWeight + Processor\ Usage * ProcessorUsageWeight}{BatteryLevelWeight + ProcessorUsageWeight,}$$

wherein the BatteryLevelWeight=3, and the ProcessorUsageWeight=1.

8. The method of claim 1, wherein each power mode comprises operating parameters for functional units of the add-on component.

9. The method of claim 8, wherein one of the operating parameters comprises how often to scan for a wireless network connection.

10. A computer readable medium having stored thereon a sequence of instructions, which when executed by a processor, cause the processor to perform a method comprising:
    determining a processor usage for a processor of a host processing system;
    determining a battery level for a battery of the host processing system;
    calculating a power mode value based on the processor usage, the battery level, a
    processor usage weight, and a battery level weight;
    selecting the power mode based on the power mode value; and
    operating an add-on component within the host processing system in the power mode.

11. The computer readable medium of claim 10, wherein the add-on component comprises a Network Interface Card.

12. The computer readable medium of claim 10, wherein determining the processor usage comprises reading a value corresponding to the processor usage from a register of the processor.

13. The computer readable medium of claim 10, wherein determining the battery level comprises querying an operating system for the processing system to obtain the battery level.

14. The computer readable medium of claim 10, wherein calculating the power mode value is in accordance with the formula:

$$PowerModeSetting = \frac{\text{Battery Level} * BatteryLevelWeight + \text{Processor Usage} * ProcessorUsageWeight}{BatteryLevelWeight + ProcessorUsageWeight,}$$

wherein the BatteryLevelWeight=3, and the ProcessorUsageWeight=1.

15. The computer readable medium of claim 10, wherein each power mode comprises operating parameters for functional units of the add-on component.

16. The computer readable medium of claim 15, wherein one of the operating parameters comprises how often to scan for a wireless network connection.

17. A system, comprising:
a processor;
a Network Interface Card (NIC) coupled to the processor; and
a memory coupled to the processor, the memory storing instructions which when executed by the processor, cause the processor to perform a method comprising:
determining a processor usage for a processor of a host processing system;
determining a battery level for a battery of the host processing system;
calculating a power mode value based on the processor usage, the battery level, a
processor usage weight, and a battery level weight;
selecting the power mode based on the power mode value; and
operating the NIC in the power mode.

18. The processing system of claim 17, which is a mobile processing system.

19. The system of claim 17, wherein determining the processor usage comprises reading a value corresponding to the processor usage from a register of the processor.

20. The system of claim 17, wherein determining the battery level comprises querying an operating system for the processing system to obtain the battery level.

21. The system of claim 17, wherein the method is performed by a driver for the NIC.

22. The system of claim 17, wherein calculating the power mode is in accordance with the formula:

$$PowerModeSetting = \frac{\text{Battery Level} * BatteryLevelWeight + \text{Processor Usage} * ProcessorUsageWeight}{BatteryLevelWeight + ProcessorUsageWeight,}$$

wherein the BatteryLevelWeight=3, and the ProcessorUsageWeight=1.

23. The system of claim 17, wherein each power mode comprises operating parameters for functional units of the NIC.

24. The system of claim 23, wherein one of the operating parameters comprises how often to scan for a wireless network connection.

* * * * *